United States Patent

Roberts

[15] 3,705,380
[45] Dec. 5, 1972

[54] METHOD OF INTERCONNECTING PARTS
[72] Inventor: Maurice Roberts, Warwickshire, England
[73] Assignee: Joseph Lucas (Industries) Limited, Birmingham, England
[22] Filed: Feb. 18, 1971
[21] Appl. No.: 116,509

[30] Foreign Application Priority Data

March 5, 1970 Great Britain....................10,545/70

[52] U.S. Cl. ............339/218 R, 339/59 R, 29/622, 264/249
[51] Int. Cl. .............................................H01r 9/08
[58] Field of Search........339/218, 219, 220, 275, 59; 264/249, 23; 156/73; 29/510, 630 B, 622

[56] References Cited

UNITED STATES PATENTS

| 2,052,616 | 9/1936 | Gardes | 18/59 |
| 3,512,121 | 5/1970 | Bergeron | 339/198 |
| 2,892,172 | 6/1959 | McGann | 339/59 R |
| 3,562,699 | 2/1971 | Branden et al. | 339/220 R |
| 3,074,292 | 1/1963 | Polmon | 264/249 |
| 3,364,002 | 1/1968 | Michel | 65/59 |
| 3,184,353 | 5/1965 | Balamuth et al. | 174/165 |

Primary Examiner—Marvin A. Champion
Assistant Examiner—Robert A. Hafer
Attorney—Holman & Stern

[57] ABSTRACT

In a method of interconnecting a pair of parts at least one of which is thermoplastic, the thermoplastic part has an aperture therein and one surface of the thermoplastic parts has a recess adjacent said aperture, a shoulder being defined between the recess and the aperture. The other parts have a peripheral groove and is positioned in the aperture so that the groove is adjacent the recess in the thermoplastic part and is located between the base of the recess and the one surface of the thermoplastic part. Ultrasonic energy is supplied to the shoulder to cause material from the shoulder to flow into the groove in the other part to interconnect the pair of parts.

8 Claims, 1 Drawing Figure

PATENTED DEC 5 1972
3,705,380
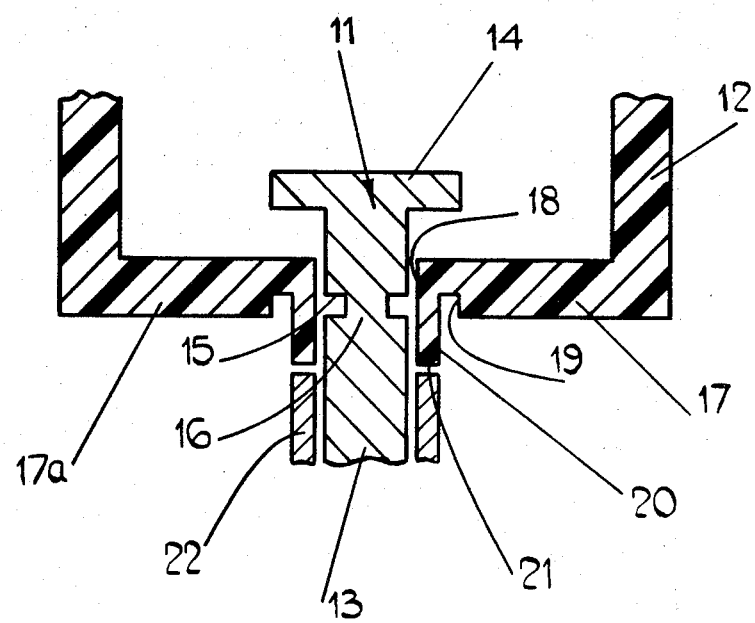
INVENTOR
Maurice Roberts
Holman & Stern
ATTORNEYS

3,705,380

METHOD OF INTERCONNECTING PARTS

This invention relates to a method of interconnecting a pair of parts at least one of which is thermoplastic.

In a method according to one aspect of the invention:
a. the thermoplastic part has an aperture therein,
b. one surface of said thermoplastic part has a recess adjacent said aperture, a shoulder being defined between the recess and the aperture,
c. the other part has a peripheral groove and is positioned in said aperture so that said groove is adjacent the recess in said thermoplastic part and is located between the base of the recess and said one surface, and
d. ultrasonic energy is supplied to the shoulder to cause material from the shoulder to flow into said groove to interconnect said pair of parts.

Conveniently, said recess extends completely around the periphery of said aperture whereby said shoulder defined between the recess and said aperture is annular, and preferably said groove defines an integral neck on said other part of smaller cross-section than the remainder of the other part.

Preferably, the dimensions of said shoulder are such that when ultrasonic energy is supplied to the shoulder material flows into said groove and into said recess to fill the groove and the recess and further such that when the ultrasonic energy is removed said one surface of said thermoplastic part is plane.

Preferably said other part is a tight fit in said aperture, especially where a fluid-tight seal between the pair of parts is required.

The invention further resides in a method of interconnecting a pair of parts at least one of which is thermoplastic wherein:
a. the thermoplastic part has an aperture therein and a hollow spigot integral with said thermoplastic part extends from one surface thereof, said spigot defining with said one surface a recess in the one surface and the bore in the spigot communicating with said aperture,
b. the other part has a peripheral groove and is positioned in the bore in said spigot so that said groove is adjacent said recess in said thermoplastic part and is located between the base of the recess and said one surface, and
c. ultrasonic energy is supplied to the spigot to cause material from the spigot to flow into said groove to interconnect said pair of parts.

The accompanying drawing is a sectional view illustrating a method according to one example of the invention.

Referring to the drawings, it is required to connect an electrical contact terminal 11 to a polypropylene switch housing 12. The terminal 11 includes a shank 13 and a head 14 of greater cross-section than the shank 13 at one end of the shank. The shank 13 is further provided intermediate its ends with a circumferential groove 15 defining an integral neck 16 of smaller cross-section than the shank 13.

The housing 12 includes an integral base 17 which is formed with an aperture 18 through which the shank 13 will pass but the head 14 will not, the shank 13 being a tight fit in the aperture 18. Extending from the outside surface 17a of the base 17 adjacent the aperture 18 is a hollow cylindrical spigot 20 integral with the base 17 and arranged so that the bore in the spigot 20 communicates with the aperture 18. The spigot 20 defines with the surface 17a of the base 17 a recess 19 in the surface 17a, the recess 19 extending around the periphery of the aperture 18. The free end of the spigot 20 defines an annular shoulder 21 between the aperture 18 and the recess 19 and by virtue of the fact that the shoulder 21 is defined by the spigot 20 extending from the surface 17a the shoulder is spaced above the surface 17a. It is however to be appreciated that the provision of the spigot 20 is not essential in which case the shoulder 21, defined between the recess 19 and the aperture 18 would form part of the surface 17a.

To connect the terminal 11 to the housing, the terminal 11 is engaged in the aperture 18 and the bore in the spigot 20 with the head 14 adjacent to but spaced from the inside surface of the base 17 and with the groove 15 adjacent the recess 19 and located between the base of the recess 19 and the surface 17a. Ultrasonic energy is then imparted to the shoulder 21 by means of a sonotrode (not shown) in contact with the shoulder. The vibrational energy imparted to the shoulder 21 causes material to flow from the shoulder into the groove 15 so that when the sonotrode is removed the terminal 11 is joined to the housing 12. Material also flows into the recess 19 and in the preferred example, shown in the drawing, the dimensions of the shoulder 21 are such that sufficient material flows from the shoulder to fill the groove 15 and the recess 19 and further such that the lower surface 17a of the base is plane after the ultrasonic welding operation.

Having thus described my invention what I claim as new and desire to secure by Letters Patent is:

1. A method of interconnecting a pair of parts at least one of which is thermoplastic wherein the thermoplastic part has an aperture therein and one surface of the thermoplastic part has a recess adjacent said aperture, a shoulder being defined between the recess and the aperture, and wherein the other part has a peripheral groove, the method comprising the steps of:
   a. inserting the other part in the aperture in the thermoplastic part until the groove is located between the base of the recess and said one surface of the thermoplastic part and is positioned adjacent said recess, and
   b. supplying ultrasonic energy to said shoulder so that thermoplastic material from said shoulder flows, and
   c. causing thermoplastic material flowing from said shoulder to enter the groove in said other part and the recess in said thermoplastic part so as to interconnect the pair of parts.

2. A method as claimed in claim 1 wherein said recess extends completely around the periphery of said aperture whereby said shoulder, defined between the recess and said aperture, is annular.

3. A method as claimed in claim 1 wherein said groove defines an integral neck on said other part of smaller cross-section than the remainder of the other parts.

4. A method as claimed in claim 1 wherein thermoplastic material flowing from said shoulder is caused to fill the groove and the recess so that when the ultrasonic energy is removed from said shoulder said one surface of the thermoplastic part is plain.

5. A method as claimed in claim 1 wherein said other part is a tight fit in said aperture.

6. A method as claimed in claim 1 wherein said thermoplastic part is a switch housing and said other part is an electrical contact terminal.

7. A method of interconnecting a pair of parts at least one of which is thermoplastic wherein the thermoplastic part has an aperture therein and a sleeve is integral with and upstanding from one surface of said thermoplastic part, the sleeve defining with said one surface a recess in the one surface and the bore in the sleeve communicating with said aperture, and wherein the other part has a peripheral groove, the method comprising the steps of:

a. inserting the other part through the bore in said sleeve into the aperture in the thermoplastic part until the groove is located between the base of the recess and said one surface of the thermoplastic part and is positioned adjacent said recess, and b. supplying ultrasonic energy to the sleeve to cause thermoplastic material from the sleeve to flow, and c. causing thermoplastic material flowing from said sleeve to enter the groove in said other part and the recess in the thermoplastic part to interconnect the pair of parts.

8. A method as claimed in claim 7 wherein said thermoplastic part is a switch housing and said other part is an electrical contact terminal.

* * * * *